(12) United States Patent
Meure et al.

(10) Patent No.: US 10,828,803 B2
(45) Date of Patent: Nov. 10, 2020

(54) METHOD OF LOCALLY INFLUENCING RESIN PERMEABILITY OF A DRY PREFORM

(71) Applicant: The Boeing Company, Chicago, IL (US)

(72) Inventors: Sam Meure, Heatherton (AU); Martin Szarski, Canterbury (AU)

(73) Assignee: The Boeing Company, Chicago, IL (US)

( * ) Notice: Subject to any disclaimer, the term of this patent is extended or adjusted under 35 U.S.C. 154(b) by 354 days.

(21) Appl. No.: 15/658,659

(22) Filed: Jul. 25, 2017

(65) Prior Publication Data

US 2018/0056546 A1 Mar. 1, 2018

(30) Foreign Application Priority Data

Aug. 29, 2016 (AU) ................................ 2016222310

(51) Int. Cl.
| | |
|---|---|
| *B29B 11/14* | (2006.01) |
| *B29C 70/54* | (2006.01) |
| *B29C 70/44* | (2006.01) |
| *B29C 70/68* | (2006.01) |
| *B29L 31/30* | (2006.01) |

(52) U.S. Cl.
CPC ............ *B29B 11/14* (2013.01); *B29C 70/443* (2013.01); *B29C 70/547* (2013.01); *B29C 70/68* (2013.01); *B29L 2031/3076* (2013.01)

(58) Field of Classification Search
CPC ....... B29B 11/14; B29C 70/68; B29C 70/443; B29L 2031/3076
See application file for complete search history.

(56) References Cited

U.S. PATENT DOCUMENTS

| | | | | |
|---|---|---|---|---|
| 2010/0086765 | A1* | 4/2010 | Inston | B29C 70/086 428/311.51 |
| 2011/0014419 | A1* | 1/2011 | Simmons | B29C 70/20 428/114 |
| 2013/0280483 | A1* | 10/2013 | Hayashi | B29C 70/48 428/137 |
| 2014/0374018 | A1 | 12/2014 | Creaser et al. | |

FOREIGN PATENT DOCUMENTS

WO WO2008099207 A1 8/2008

OTHER PUBLICATIONS

Extended European Search Report, dated Feb. 1, 2018, regarding Application No. 17183207.4, 7 pages.

* cited by examiner

*Primary Examiner* — James M Mellott
(74) *Attorney, Agent, or Firm* — Yee & Associates, P.C.

(57) ABSTRACT

Resin permeation of a dry preform having one or more reinforcement plies is locally influenced during resin infusion using a selectively permeable veil applied to at least one of the reinforcement plies.

20 Claims, 11 Drawing Sheets

METHOD OF LOCALLY INFLUENCING RESIN PERMEABILITY OF A DRY PREFORM

BACKGROUND INFORMATION

1. Field

The present disclosure generally relates to the fabrication of composite structures and in particular relates to a method of locally influencing resin permeation through a dry preform. It further relates to a method of fabricating a composite component, to a dry preform and to a composite component.

2. Background

A current method for fabricating composite structures utilizes a resin infusion process to infuse a dry preform, formed of multiple plies formed of composite fibers, with resin prior to curing of the resin to form a composite structure. According to a current method, the composite dry preform and a peel ply layer is located on a tool surface and a vacuum bagging film is placed over the tool surface to cover the dry preform and peel ply and sealed to form a sealed chamber between the tool surface and vacuum bagging film. Resin is infused through the composite dry preform by application of vacuum pressure to a downstream end of the sealed chamber, drawing resin from an upstream resin supply through the composite dry preform. Once the resin has been infused throughout the preform, the entire assembly is heated, typically in an oven, to cure the resin, impregnate the preform and thus form the composite structure.

Resin infuses through the dry preform with a flow front that may or may not progress evenly across the lateral extent of the preform. It is important to ensure that the entire preform is impregnated within tolerances. Highly integrated complex dry fiber preforms can have areas that are less permeable than other areas of the preform due to the geometry of the preform or to the configuration of the fibers. The resin does not always completely impregnate these parts. As the resin cures, resin impregnation of the resulting composite component at these parts is consequently less than desired.

In dry preforms having a relatively simple geometry, a consumable flow media such as a mesh or fabric is placed on top of the peel ply to help promote resin flowing through all sections of the dry preform. However, this approach may not result in desired impregnation, particularly for complex preform geometries.

SUMMARY

The present disclosure is generally directed to a method of locally influencing resin permeation through a dry preform, to a method of forming a composite component and to a dry preform. According to embodiments, a selectively permeable veil is applied to at least one reinforcement layer of the dry preform. The dry preform is then infused with resin such that the resin passes through the selectively permeable veil.

According to a first aspect, the present disclosure provides a method of locally influencing resin permeation through a dry preform. The dry preform has one or more reinforcement plies. The method includes the steps of applying a selectively permeable veil to at least one of the reinforcement plies of the dry preform and infusing resin into the dry preform. The selectively permeable veil has a veil pattern of a pre-determined spatial density. The resin is directed through the selectively permeable veil such that the resin impregnates through the dry preform. The selectively permeable veil is dissolved or melted into resin. Toughness is imparted, at least locally, to the preform upon resin infusion and curing of the dry preform.

According to one embodiment, the selectively permeable veil is selectively non-homogeneously permeable. The selectively permeable veil may be formed with a veil pattern having a locally varying spatial density. The volume flow rate of resin flowing through the selectively permeable veil can be controlled by locally varying the thickness of the selectively permeable veil and directing the resin through the resin path. The selectively permeable veil may be applied to increase the length of a resin path through the dry preform. The resin is then directed through the resin path to reach its endpoint. The selectively permeable veil may be applied to the dry preform by inkjet printing the veil onto a reinforcement ply of the dry preform. The selectively permeable veil may be applied to the dry preform by 3D printing the veil onto a reinforcement ply of the dry preform.

In another embodiment, the veil may be applied via pressure deposition of veil material onto a reinforcement ply of the dry preform through at least one nozzle. Alternatively, the veil may be laid up onto a reinforcement ply of the dry preform. In some embodiments, the dry preform comprises a plurality of the reinforcement plies and the method further comprises applying the selectively permeable veil to at least some or each of the reinforcement plies of the plurality of reinforcement plies. In some embodiments, a selectively permeable veil having a first veil pattern may be applied to at least a first reinforcement ply of the plurality of reinforcement plies and a further selectively permeable veil having a second veil pattern is applied to at least a second reinforcement ply of the plurality of reinforcement plies. The second veil pattern may have a different spatial density and/or thickness to the first veil pattern.

According to a second aspect, the present disclosure provides a method of fabricating a composite component, comprising locally influencing resin permeation through a dry preform according to the first aspect to form a resin infused dry preform, and curing the resin infused dry preform to produce the composite component. In one embodiment, the composite component is toughened by dissolving the selectively permeable veil into the resin during resin infusion. In another embodiment, the composite component is toughened by melting and dispersing the selectively permeable veil into the resin during resin infusion.

According to a third aspect, the disclosure provides a dry preform having a locally selective resin permeability, comprising at least one reinforcement ply and a selectively permeable veil layer applied thereto, the selectively permeable veil having a veil pattern of a pre-determined spatial density and being adapted to dissolve or melt into resin. The selectively permeable veil layer may be non-homogeneously permeable. According to one embodiment, the selectively permeable veil layer has a veil pattern with a locally varying spatial density and/or thickness. In some embodiments, the dry preform comprises of a plurality of the reinforcement plies and the selectively permeable veil is applied to at least some or each of the plurality of reinforcement plies. In some embodiments, the selectively permeable veil is made of a resin soluble material. In other embodiments, the selectively permeable veil is made of a material that is adapted to melt and disperse into resin during a resin curing process. The dissolved selectively permeable veil may at least locally impart toughness to the preform upon resin infusion and curing of the dry preform.

According to another aspect, there is provided a composite component, comprising a dry preform according to the third aspect, infused with resin and cured.

According to a still further aspect, there is provided a selectively permeable veil having a veil pattern of a predetermined spatial density and being adapted to dissolve or melt into resin to at least locally impart toughness to a dry preform to which it is applied upon resin infusion and curing of the dry preform.

According to a yet further aspect, there is provided a method of toughening a resin infused preform, comprising placing the selectively permeable veil of the still further aspect upon at least one reinforcement ply of a dry preform and toughening the dry preform by dissolving or melting the selectively permeable veil into resin infused into the dry preform.

The features that have been discussed can be achieved independently in various embodiments or may be combined in yet other embodiments, further details of which can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Methods and apparatus according to exemplary embodiments of the present disclosure will now be described in detail. In general, methods of locally influencing resin permeation through a dry preform according to the present disclosure include applying a selectively permeable veil to at least one fiber reinforcement ply of the dry preform. The dry preform is then infused with resin such that the resin passes through the selectively permeable veil. The selectively permeable veil may be selectively non-homogeneously permeable and can be designed to speed up the flow of resin through some areas of the reinforcement ply and/or to slow down the flow of resin through the reinforcement plies in other areas so as to control resin impregnation through the preform. The veil can be applied to the reinforcement plies by 3D inkjet printing the veil onto a reinforcement ply layer of the dry preform. It is also envisaged that the veil could be applied to the reinforcement ply layer by alternative 3D printing methods or by jet pressure nozzle deposition or manual layup. However, a variety of other application techniques are possible. The resin infused dry preform may then be cured, typically within a heated oven or autoclave, to produce a composite component. During the curing, the selectively permeable veil melts or dissolves into the resin, forming a veil resin mixture that toughens the composite component when cured.

Figure 1:
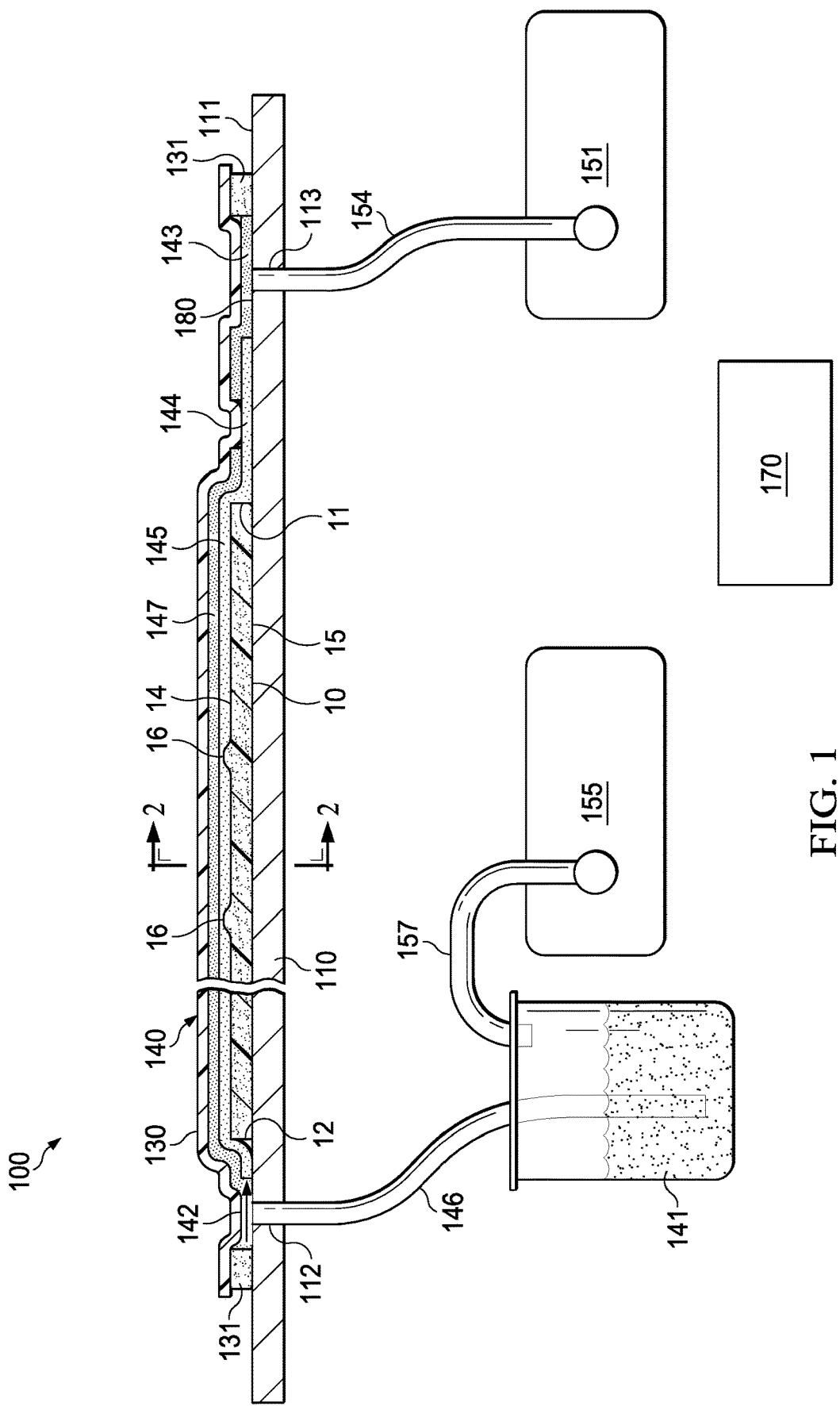
FIG. 1 is a schematic cross-sectional view of a system for resin infusion of a dry preform.

Referring to FIG. 1 of the accompanying drawings, a system 100 for resin infusion of a dry preform will now be described. The system 100 includes a dry composite preform 10 having an upper surface 14 and an opposing lower surface 15. The upper surface 14 and the lower surface 15 each define a preform major surface. The dry preform 10 is to be infused with an exothermically curing resin provided in a resin supply 141.

The system shown in FIG. 1 is of a single vacuum bag composite layup configuration. In this configuration, the system 100 has a tool 110 having an upper tool surface 111, with the lower surface 15 of the dry preform 10 being located on the tool surface 111. A vacuum bagging film 130 extends over the dry preform 10 and is sealed relative to the tool surface 111 to define a sealed first cavity 140 between the vacuum bagging film 130 and the tool surface 111. The dry preform 10 is located in the first cavity 140. It is also envisaged that a second vacuum bagging film covering the first vacuum bagging film can be used to minimize possible air permeation through the single vacuum bagging film as vacuum is applied during the curing process.

The tool 110 may be formed of any of various structural materials, including mild steel, stainless steel, invar or a carbon composite material that will maintain its form at elevated temperatures associated with curing, so as to provide a geometrically stable tool surface 111 though the resin curing process. The tool surface 111 may be substantially flat for the production of composite structures having a substantially flat lower surface, such as wing or fuselage skin panels, or otherwise shaped as desired so as to provide a shaped surface of a non-planar composite structure, for example the tool may be a former or a mandrel.

Figure 2:
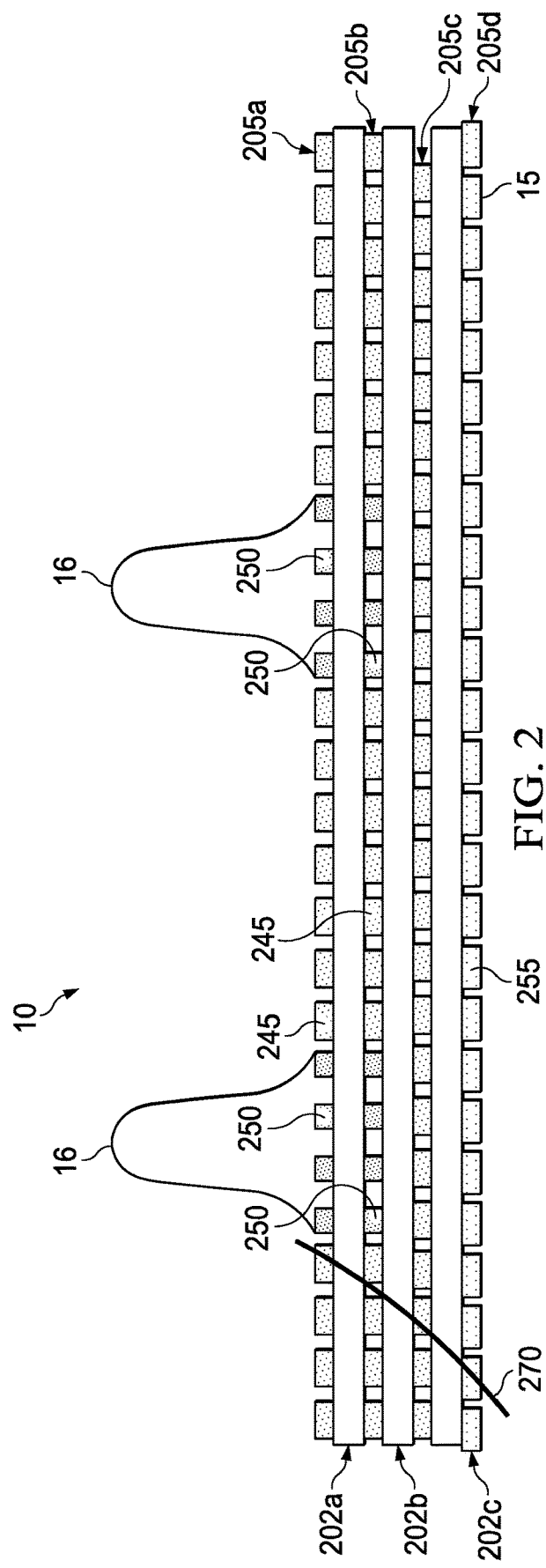
FIG. 2 is a schematic cross-sectional view of the dry preform of FIG. 1, interleaved with layers of selectively permeable veil.

The dry preform 10 may take any form suitable for resin infusion and as dictated by the geometric and structural requirements of the laminated composite structure to be fabricated. In the embodiment of FIG. 2, the dry preform 10 comprises a layup of multiple plies 202 of reinforcing material, each formed of woven or braided fibers and/or chopped strand mat. The preform plies 202 may be formed of any of various reinforcing fibers, such as carbon, graphite, glass, aromatic polyamide or any other suitable material for fabricating a resin reinforced laminated composite structure. The plies 202 form a dry preform 10, without any resin. The plies 202 are interleaved with layers of a selectively permeable veil 205 having a veil pattern of a predetermined spatial density. The dry preform 10 is located on the tool surface 111 with the lower surface 15 of the preform 10 oriented on the tool surface 111 such that the lower surface of the resulting cured composite structure will match the form of the tool surface 111. The dry preform 10 located on the tool surface 111 has a laterally extending downstream edge 11, an opposing laterally extending upstream edge 12 and opposing longitudinally extending side edges. In the context of the present specification, upstream and downstream sides of the dry preform 10 are identified with reference to the direction of flow of resin, as will be further described. The preform 10 may take any desired shape corresponding to the shape of the laminated composite structure to be formed. It should be noted here that while four permeable veils 205 are shown in the example of FIG. 2, as few as a single permeable veil 205 may be placed at any location within a layup of plies 202, depending on the application.

The dry preform 10 may have a uniform thickness or, alternatively as depicted in the first embodiment of FIGS. 1 and 2, the dry preform 10 may have a locally non-uniform thickness as measured between the upper surface 14 and the lower surface 15. Particularly, in the arrangement depicted, the portions 16 of the dry preform 10 have a thickness that is significantly greater than an average thickness of the dry preform 10. In this first embodiment, the thicker portions 16 of the dry preform 10 have an increased thickness as a result of being provided with additional plies of reinforcing material to provide local structural features of the specific part being fabricated. For example, the additional plies can form 'padup' regions at locations of the preform 10 at which fasteners will be received in the resulting composite component. Such portions of dry preforms having a locally increased thickness generally have a higher volume of resin per unit of preform surface area once resin infused, given the increased thickness of preform and thus resin. However, such thicker portions are more susceptible to resin starvation if the resin does not impregnate the thicker portions 16, as will be discussed further below. The multiple layers of selectively permeable veil 205 interleaved with the reinforcement plies 202 are described in further detail below.

The resin supply 141 communicates with the first cavity 140 through one or more resin infusion inlets 112 extending through the tool 110 on the upstream side of the dry preform 10, via one or more resin supply pipes 146. The resin supply pipes 146 are typically formed of copper. A first vacuum source 151 communicates with the first cavity 140 through one or more vacuum outlets 113 extending through the tool 110 on a downstream side of the dry preform 10, via one or more vacuum outlet pipes 154, which are also typically formed of copper. Rather than communicating the resin supply 141 and first vacuum source 151 with the first cavity 140 via the resin infusion inlet 112 and vacuum outlet 113 extending through the tool 110, it is also envisaged that the resin supply 141 and first vacuum source 151 may communicate with the first cavity 140 through the vacuum bagging film 130. In such a configuration, apertures may be formed in the vacuum bagging film 130 and communicated with the resin supply 141 and first vacuum source 151, sealing around the apertures. In the embodiment depicted, the resin supply 141 also communicates with a second vacuum source 155 via a second vacuum pipe 157.

A flow path 142 extends from the resin supply 141, through the first cavity 140, the dry preform 10 and to the first vacuum source 151. An upstream portion of the flow path 142 comprises the resin supply pipe(s) 146 and resin infusion inlet 112 extending through the tool 110. A mid portion of the flow path 142, defined by the first cavity 140, is formed by the dry preform 10 and various layers of layup materials located beneath the vacuum bagging film 130. The layup materials include a permeable peel ply 145 located directly on, and extending over, the entirety of the dry preform 10, beyond each of an upstream edge 12 and a downstream edge 11, of the dry preform 10, with a downstream portion 144 of the peel ply 145 extending downstream of the downstream edge 11 of the dry preform 10. A layer of permeable flow media 147 is placed over the peel ply 145 and extends beyond the upstream edge of the peel ply 145 to beyond the resin infusion inlet(s) 112. The layer of permeable flow media 147 extends to beyond the downstream edge 11 of the dry preform 10 but does not cover the entirety of the downstream portion 144 of the peel ply 145. The peel ply 145 serves to prevent the layer of permeable flow media 147 from sticking to the dry preform 10 and also provides a path for infusion of resin through the peel ply 145 into the dry preform 10, including through the selectively permeable veil 205, both along the upstream edge 12 of the dry preform 10 and through the upper surface 14 of the dry preform 10. The peel ply 145 also allows volatiles given off during curing of the resin to be drawn away from the dry preform 10. The peel ply 145 also constitutes a permeable flow media, and may suitably be in the form of a PTFE coated fiberglass fabric, such as Release Ease® 234, available from AirTech International Inc, or any other permeable peel ply material. The layer of permeable flow media 147 provides a passage for the resin through the first cavity 140 along the top of the dry preform 10, along with a path for the escape of volatiles from the first cavity 140. The layer of permeable flow media 147 may suitably be in the form of a nylon mesh material, such as Plastinet® 15231 also available from AirTech International Inc, or any other highly permeable media enabling passage of resin therethrough. In this regard, the quality of the infusion paramount. Maintaining a controlled resin flow front with lower permeability flow media 147 over the preform 10 gives cleaner infusions. The permeable flow media 147 should allow the resin to flow laterally slowly enough that the resin can uniformly drop down through the preform to wet out and the preform with a wedge shaped flow profile until it is impregnated within tolerances. In a controlled flow front, the resin front on the vacuum bagging film 130 side of the preform 10 is only 2 or 3 inches ahead of the resin flow front on the tool 110 side of the preform 10 assuming the permeable flow media 147 is placed only on the vacuum bagging film 130 side of the preform 10 and infusion includes lateral flow through the media 147 followed by downward flow to impregnate the preform 10 within tolerances. The relative permeability of the flow media 147 is tailored to that of the preform to achieve a controlled infusion.

A downstream portion of the flow path 142 comprises a further strip 143 of permeable flow media, the vacuum outlet(s) 113 and vacuum outlet pipe(s) 154. The strip 143 of permeable flow media extends across the downstream edge of the downstream portion 144 of the peel ply 145 and extends further downstream across the vacuum outlet(s) 113. The strip 143 of permeable flow media is typically formed of the same material as the layer of permeable flow media 147. A gap is located between the permeable flow media 147 and strip 143 of permeable flow media. Accordingly, the resin enters the first cavity 140, travels through the layer of permeable flow media 147 from upstream to downstream with some of the resin passing through the peel ply 145 and infusing the preform 10 until it is impregnated with resin as the resin passes through the layer of permeable flow media 147.

The vacuum bagging film 130 extends over the entire layup formed by the dry preform 10, peel ply 145 and layer 147 and strip 143 of permeable flow media. Any of various vacuum bagging film materials may be utilized, including but not limited to Airtech WL7400 or SL800 vacuum bagging films available from Airtech International Inc. The vacuum bagging film 130 is sealed relative to the tool surface 111 about the periphery of the vacuum bagging film 130 by way of strips 131 of sealing tape, which may conveniently be in the form of a mastic sealant tape, such as GS-213-3 sealant tape available from AirTech International Inc.

The vacuum bagging film 130 defines the upper boundary of the resin flow path 142. In the gap located between the layer 147 and strip 143 of permeable flow media, the vacuum bagging film 130 restricts the thickness of the flow path 142 between the tool surface 111 and vacuum bagging film 130 to the downstream portion 144 of the peel ply 145, which is typically of a reduced permeability as compared to the layer of permeable flow media 147. All downstream flow of resin is thus restricted through the downstream portion 144 of the peel ply 145, creating a permeable resin flow control choke 180 that slows down the flow rate of resin to the vacuum outlet(s) 113.

Referring now to FIG. 2, the multiple reinforcement plies 202 that comprise the preform 10 are layered on top of one another and interleaved with layers of selectively permeable veil 205. The preform 10 comprises three reinforcement plies 202a, 202b and 202c interleaved between veil layers 205a, 205b, 205c and 205d. The veil layers 205 are interleaved with the reinforcement plies 202 to provide increased strength and toughness to the resulting composite component, once they dissolve or melt into and locally mix with the resin and impregnate the adjacent reinforcement ply 202. The selectively permeable veil layers 205 may be made from any material that is suitable for providing the desired properties of the resulting composite component, including but not limited to carbon filaments, glass filaments and thermoplastic polymers such as vinylester, polyester, phenolic, epoxy, bismaleimides, cyanate esters. The veil material may include a flexible thermoplastic polymer element that is chemically and physically at least partially soluble in a curable resin matrix at a temperature that is lower than its melt temperature. Alternatively, the veil material may melt into and diffuse into the resin at high cure temperatures.

Figure 2A:
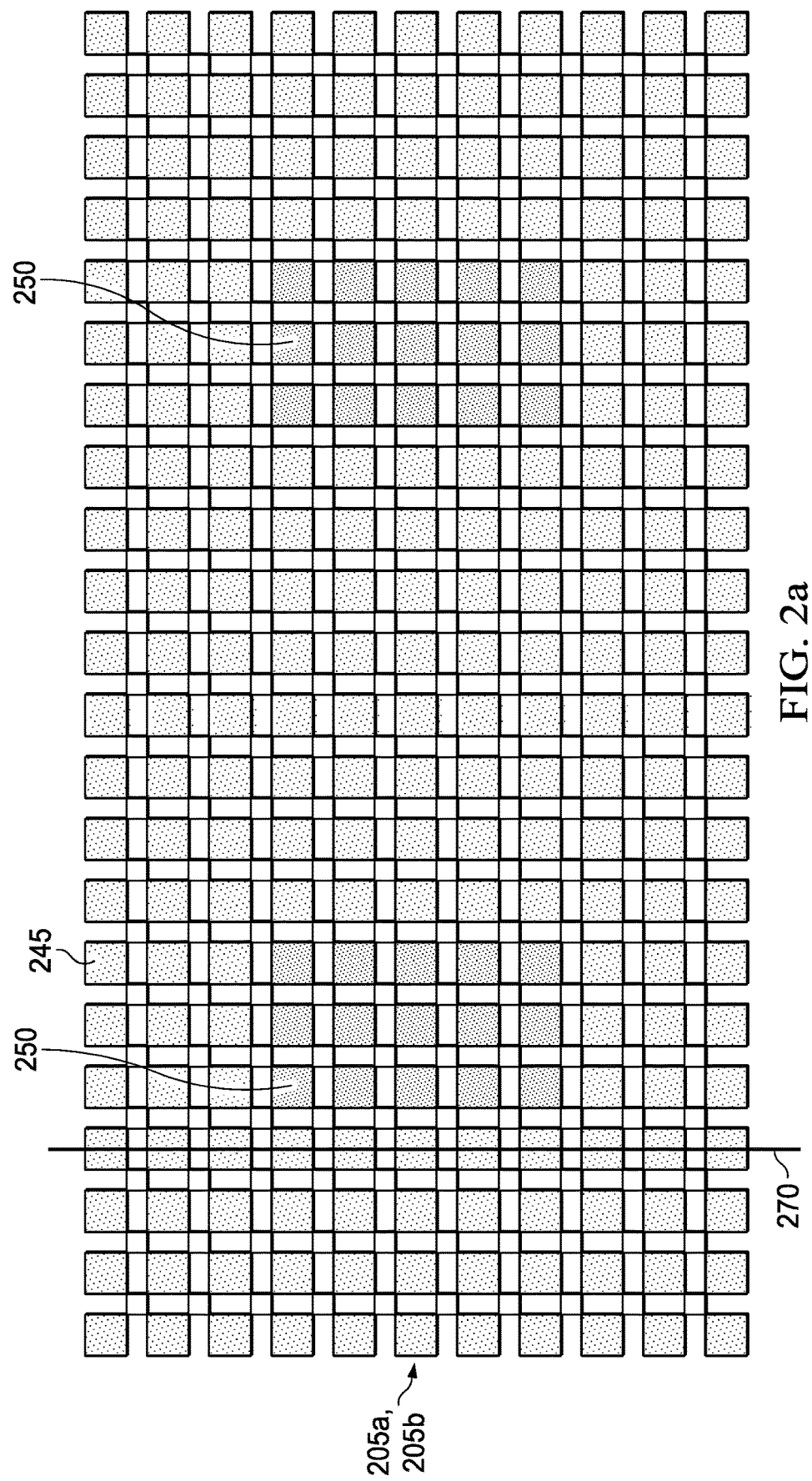
FIGS. 2a-2c are schematic plan views of the layers of selectively permeable veil of FIG. 2.
Figure 2B:
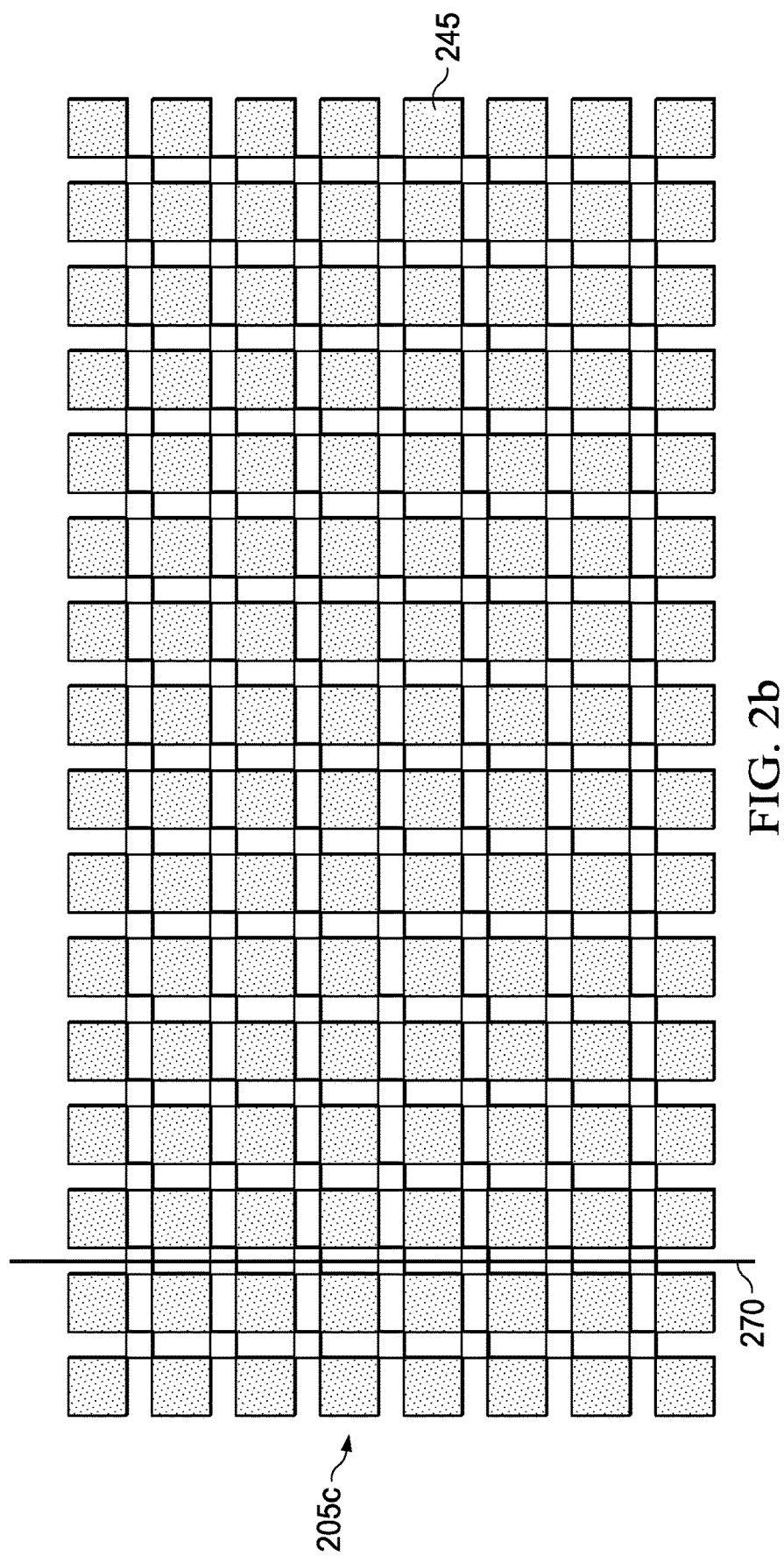
Figure 2C:
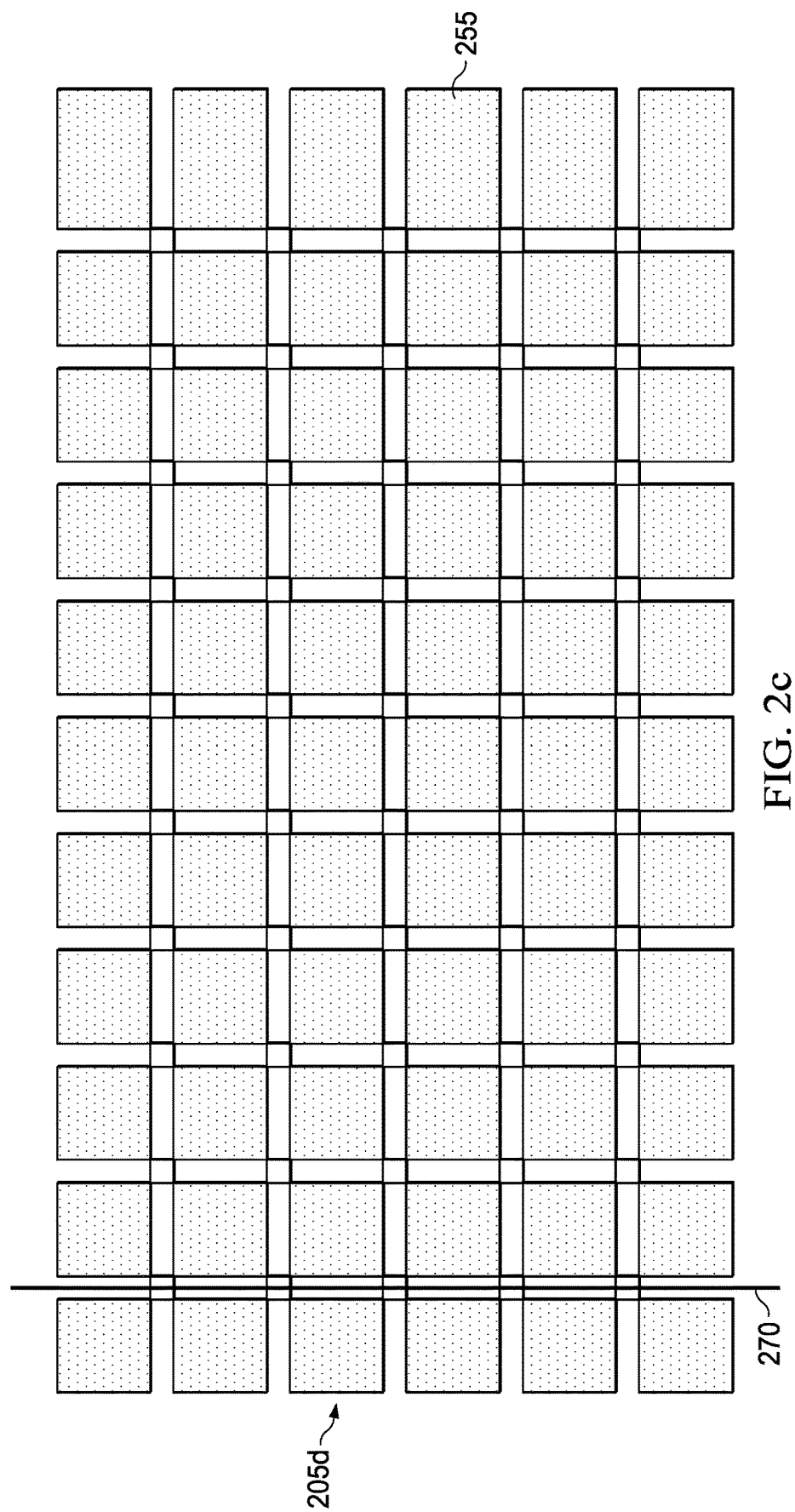

In the example of FIG. 2, each of the veil layers 205a, 205b, 205c and 205d have been designed with a specific and selective permeability in order to either increase or decrease resin flow through the preform 10 to achieve a specific objective. The permeability is determined by the pattern of the veil material that comprises the layer. Some veil layers (e.g. veil layers 205c and 205d shown in FIGS. 2, 2b and 2c) have a veil pattern with a substantially homogeneous spatial density throughout the layer and as such have a substantially uniform or homogeneous permeability throughout the veil layer. Other veil layers (e.g. veil layers 205a and 205b, shown in FIGS. 2 and 2a) are non-homogeneously permeable, having a veil pattern with areas of locally differing spatial density designed to achieve a specific resin infusion volume. Veil layer 205a lies above the uppermost reinforcement ply 202a and consists mainly of a mid permeability pattern 245 having a pre-determined spatial density that is intended to evenly and steadily distribute resin throughout large areas of the preform 10 whilst maintaining a resin flow front 270 of resin to be infused through the preform 10 at a controlled pace. The pattern is designated as being of a 'mid' permeability relative to the permeability of other veil layers within the preform 10 or other portions of the same veil layer, which are designated as being of 'high' or 'low' permeability. As such, the different designated permeabilities of veil layers or portions of veil are intended to convey a relative porosity of the veil or portion of veil for the purpose of distributing resin through the veil or portion of veil at different flow rates. For example, directly beneath the thicker portions 16 of the reinforcement ply 202a, the veil pattern has a high permeability pattern 250 (relative to the mid permeability pattern) having a spatial density that is less dense and therefore more porous than the mid permeability pattern 245 to allow resin to readily feed into the high density thicker portions 16 of the preform 10. The resin travels horizontally through the mid permeability pattern 245 region of the veil 205a and as it reaches the region of high permeability pattern 250 it flows more quickly. Some of the resin will also flow vertically through the veil 205a and into the preform side of the veil 205a. The combination allows the resin to flow into and impregnate the thicker portion 16 more quickly than it might otherwise. In this manner, the choice of location of the mid and high permeability regions of the selectively permeable veil 205a is designed to speed up the resin flow vertically to the low permeability thicker portions 16 to prevent incomplete resin impregnation of the preform 10, whilst maintaining control of the resin flow front 270.

The veil layer 205b lies between the reinforcement plies 202a and 202b and has a similar non-homogeneous design of a mid permeability pattern 245 with regions of a high permeability pattern 250 directly beneath the thicker portions 16 of the preform so that resin can flow more quickly both horizontally into and vertically through the veil in the region of the thicker portions 16 to fill them more quickly than might otherwise be possible. The veil layer 205c lies between the reinforcement plies 202b and 202c. It has a homogeneous mid permeability pattern 245 throughout with a pre-determined spatial density that is intended to allow resin to be evenly and steadily distributed throughout the preform 10 at a flow rate that allows the thicker portions 16 to fill before the resin flow front 270 advances too far horizontally through the preform 10. The veil layer 205d lies beneath the reinforcement ply 202c closest to the tool 110. It has a spatially more dense, low permeability pattern 255 (relative to the mid permeability pattern 245) that is homogeneous throughout the layer and which is intended to delay or choke the flow of resin horizontally through the veil 205d to the vacuum outlet 113 to ensure that the preform 10 is impregnated within tolerance with resin before the resin flow front 270 reaches the vacuum outlet 113. From the foregoing, it may be appreciated that the veil pattern of a veil in one layer may have a different spatial density and/or thickness from the veil pattern of a veil in another layer in the preform. The veil patterns are therefore selected according to the specific requirements of the preform geometry to which they are applied, layer by layer, to achieve a complete impregnation of the resin into the preform 10 at all locations, including those normally susceptible to incomplete infusion, before the resin flows to the vacuum outlet 113.

The veil patterns shown in FIGS. 2 and 2a-2c are examples of possible veil patterns that can be used to achieve a change in permeability or porosity of the veil. Veil layers having the selected permeability can then be positioned to control the flow of resin through the preform 10. Other examples of possible veil patterns are shown in FIGS.

Figure 4:
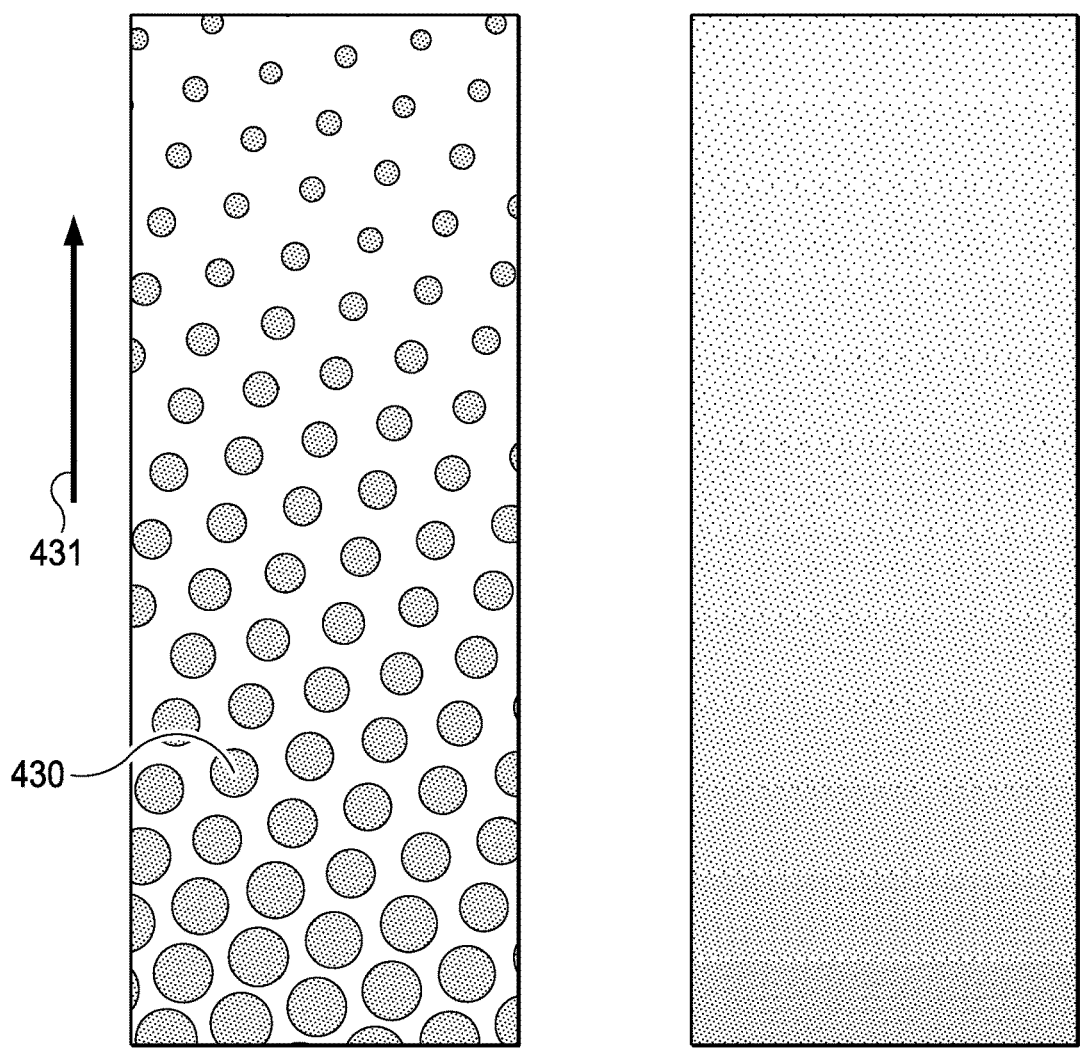
FIG. 4 is a schematic representation of a first example veil pattern shown in plan view.
Figure 5:
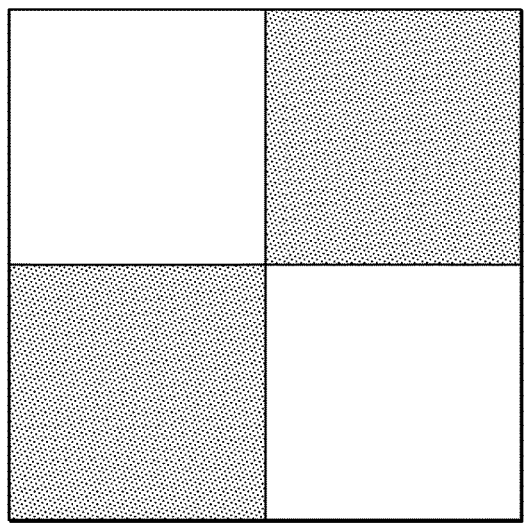
FIG. 5 is a schematic representation of a second example veil pattern shown in plan view.
Figure 5:
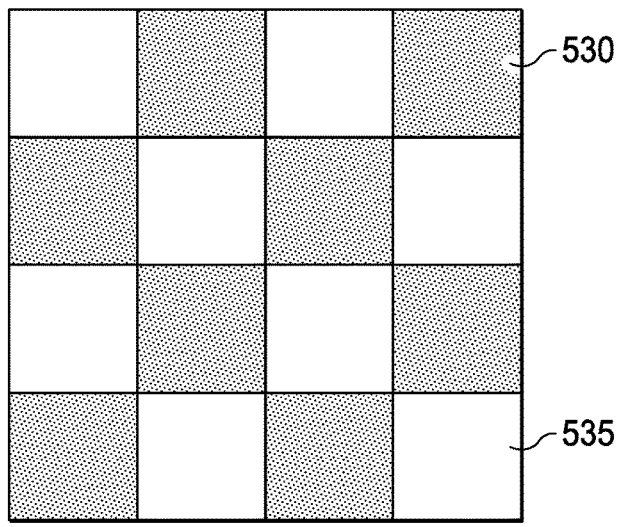
Figure 5:
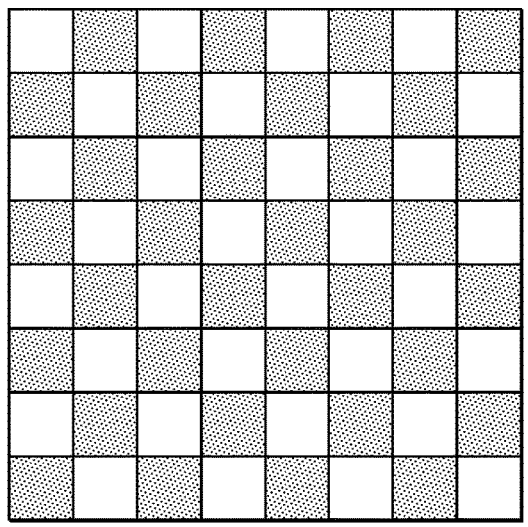
Figure 5:
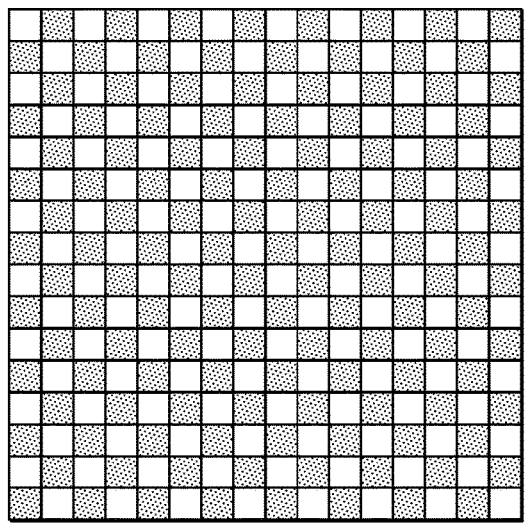
Figure 5:
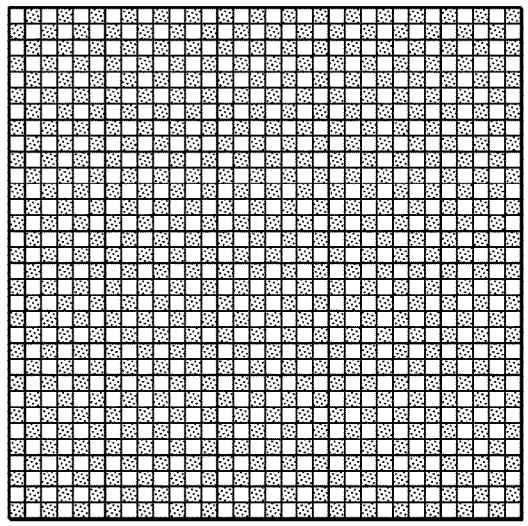
Figure 5:
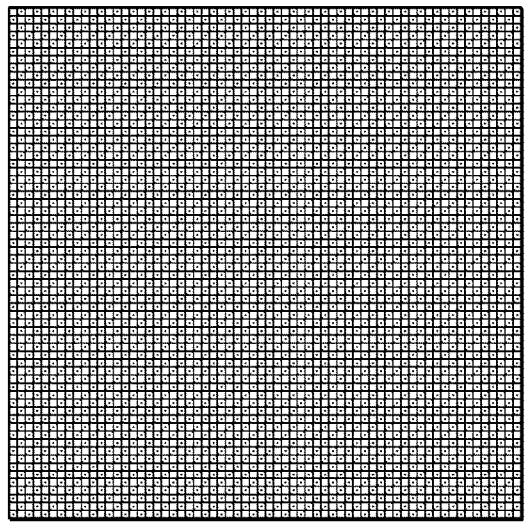

4 and 5. FIG. 4 shows a plan view of a veil pattern of circles 430 that can be increased or reduced in size to create a varying spatial density veil pattern. In FIG. 4, the direction of resin flow may be from the bottom to the top of FIG. 4 as shown by the arrow 431. The resin will flow slowly through the veil at the bottom of the Figure, both in the plane of the veil and normal to the veil, as the discrete circles 430 at the bottom of FIG. 4 are large and the gaps between them are small. As the resin flows along the veil, the discrete circles 430 decrease in size and the gaps between them become larger. The resin flow rate will gradually increase both in the plane of the veil (i.e. horizontally as the resin travels along the veil) and normal to the veil (i.e. vertically as the resin travels through the veil) as the spatial density of the pattern decreases. FIG. 5 shows a plan view of examples of a checkerboard veil pattern of alternating squares. The dark squares 530 may represent areas of veil material whilst the light squares 535 may represent gaps in the veil. The example patterns shown are of different sizes and spatial densities and can be used individually to create a veil layer of a selected homogeneous spatial density, similar to the veil layers 205b or 205c shown in FIGS. 2b and 2c and described above. Alternatively, they can be used in combination to achieve a varying spatial density veil pattern, in a manner similar to the veil 205a shown in FIG. 2a and described above. In each of FIGS. 4 and 5, the porosity of the veil pattern is determined by the size of the circles 430 in FIG. 4 and the size of the gaps between them, and by the size of the dark squares 535 in the pattern of FIG. 5 and the size of the gaps between them. For any given pattern, a larger amount of open space or gaps between elements such as the circles 430 or the squares 530 will increase the porosity of the veil to resin flowing in both the horizontal and vertical directions through the preform, increasing the resin flow rate along and through the veil. Conversely, a denser veil pattern will result in a slower flow rate of resin travelling along and through the veil. The location of a veil 205 having a porous pattern such as those shown in FIGS. 2, 2a-2c, 4 and 5 will determine how the veil affects resin distribution through the preform 10, as illustrated in the examples of FIG. 2 and in FIGS. 7-9 described below.

Figure 3:
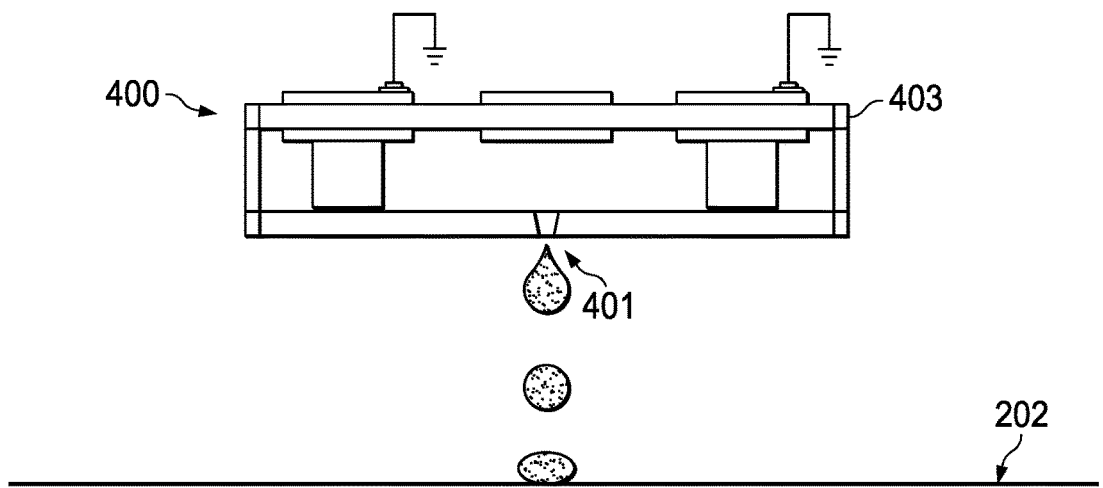
FIG. 3 is a schematic illustration of an inkjet printer for use in printing the veil on a reinforcement layer.

The veil 205 may be manufactured independently of the preform 10 and applied to the preform 10 by melt bonding the veil 205 to a reinforcement ply 202 of the preform 10. Alternatively, the veil 205 can be applied to the reinforcement ply 202 using robotic inkjet printing. In robotic printing, a specifically designed thermoplastic veil pattern can be selectively applied to each reinforcement ply 202 to build up a veil network within the preform 10 that locally varies the permeability of the preform 10 allowing for the resin impregnation of complex integrated structures such as that described with regard to FIG. 2 above. One method of fabricating the selectively permeable veil 205 within a dry preform is to apply the veil 205 to a reinforcement ply 202 using a 3D digital inkjet printer 400 as shown in FIG. 3. The digital inkjet printer 400 is a piezoelectric inkjet printer that forces tiny amounts of veil material out of a nozzle 401 upon vibration of a piezo electric crystal 403, allowing complex custom designed veil designs that achieve variable density veil patterns to be applied onto the reinforcement layer 202 to create the veil 205. The inkjet printer 400 is a 3D printer and the layer of veil 205 can be built up by printing multiple layers of the pre-determined pattern on top of one another until the required veil thickness for the desired veil application is achieved. Other means of 3D printing the veil onto the reinforcement plies are also envisaged. The permeability of the veil 205 can be precisely controlled through selective pre-determination of the veil pattern to be printed onto the reinforcement ply 202. The permeability of the veil 205 can be varied by varying the spatial density and/or the three-dimensional thickness of the veil pattern. Varying the spatial density will increase or decrease the veil permeability in both a horizontal resin flow direction along the veil and a vertical flow direction through the veil. A thicker veil will influence permeability vertically through the veil as it will take longer for the resin to flow through the thicker veil layer to the preform.

In one embodiment of the above printing technique, printing heads can be located on a braiding line to print veil material directly onto a braid as it is manufactured.

Figure 6:
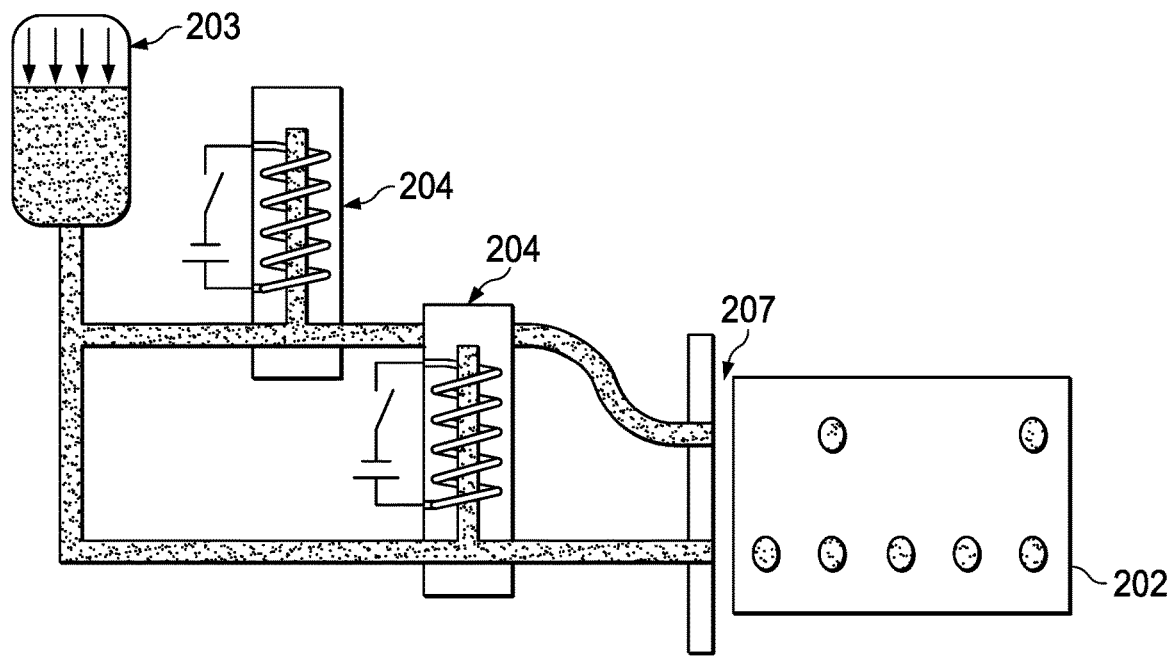
FIG. 6 is a schematic illustration of jet pressure deposition for use in depositing the veil on a reinforcement layer.

A further alternative to printing the veil 205 onto the reinforcement ply 202 is to deposit the veil material onto the reinforcement ply 202 using jet pressure deposition apparatus and techniques. In this embodiment, the veil material is initially contained in a pressurized supply 203. The veil material is deposited onto the reinforcement ply 202 in pre-determined amounts and according to a veil pattern of a pre-determined spatial density through the controlled opening and closing of solenoid valves 204 that admit the veil material to a bank of deposition nozzles 207, shown schematically in FIG. 6. The apparatus may typically have between 7 and 18 nozzles. The veil 205 is formed by covering the reinforcement ply 202 with the veil material according to a pre-determined pattern, allowing precise control of the permeability of the veil layer, whether the permeability is homogeneous throughout the layer or locally non-homogeneous in specific areas. Veils created using this apparatus may again be tailored to control the flow of resin through the veil in a predominately horizontal direction, by selecting a veil pattern of a desired spatial density. Some resin will also flow vertically through the veil 205 and again, increasing the thickness of the veil through the application of multiple layers will affect the permeability of the veil in the vertical direction.

Figure 7:
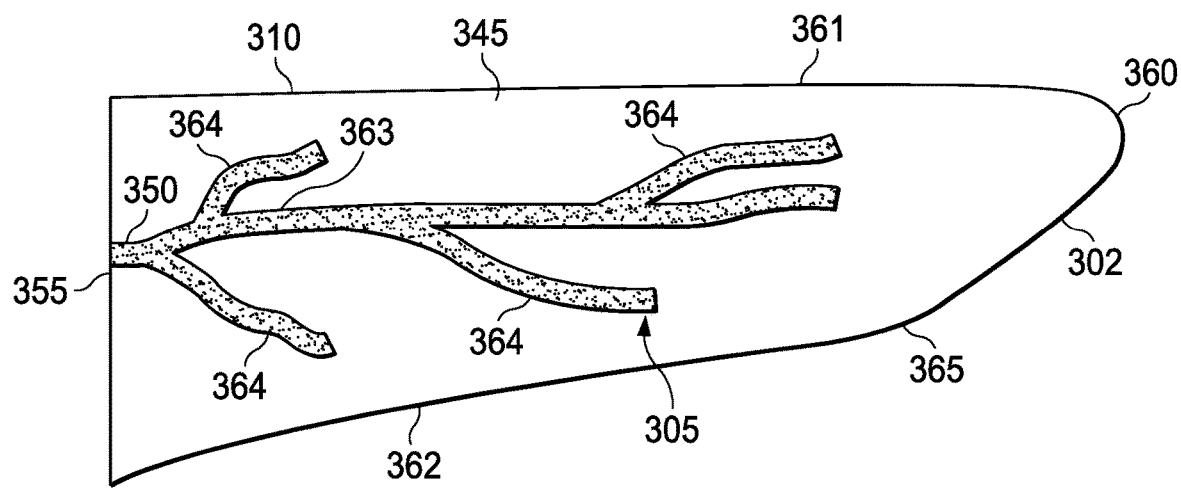
FIG. 7 is a schematic plan view representation of an example application of a selectively permeable veil to a reinforcement ply of a large dry preform.
Figure 8:
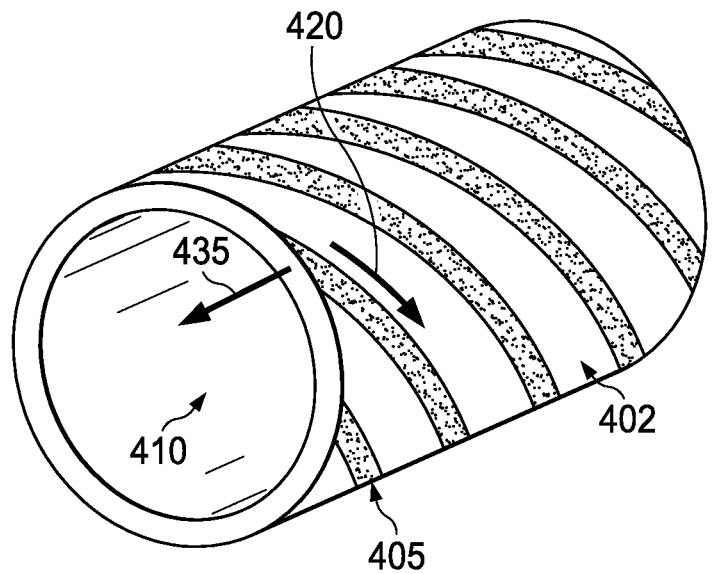
FIG. 8 is a schematic perspective view representation of an example application of a selectively permeable veil to a cylindrical dry reinforcement.
Figure 9:
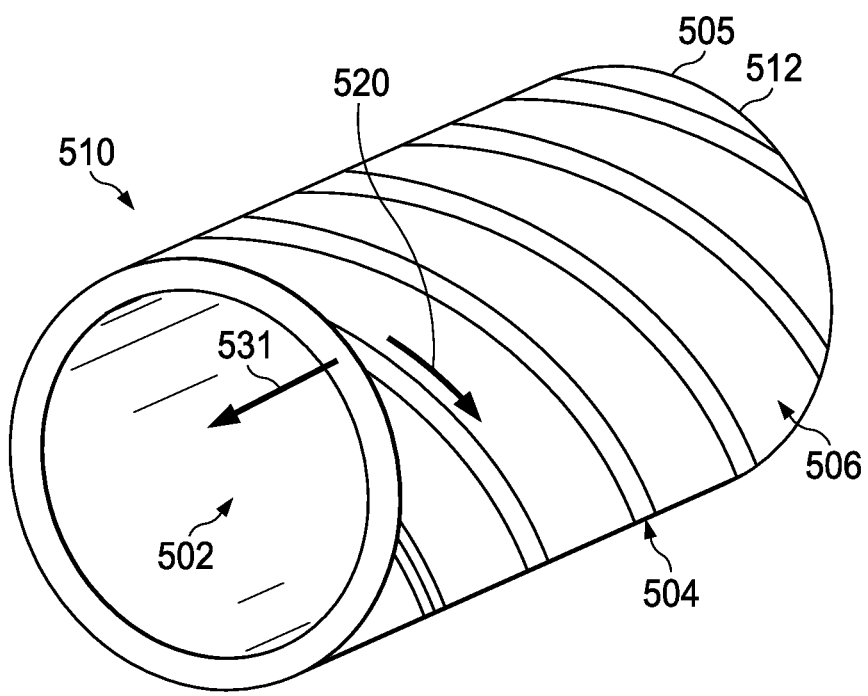
FIG. 9 is a schematic perspective view representation of another example application of a selectively permeable veil to a cylindrical dry reinforcement.

Further embodiments of the application of veil layers having selective permeability to different types of dry preform are shown in FIGS. 7 to 9. In the embodiment of FIG. 7, a reinforcement ply 302 of a large dry preform 310 for an aircraft wing is shown in plan view. It should be noted that the reinforcement ply 302 shown in FIG. 7 is one of a number of reinforcement plies that are laid up to form the preform 310 and that it may have reinforcement plies 302 above it and/or below it. As the preform 310 has such a large area when viewed from above, there is a possibility of the resin consolidating before it reaches all areas and extremities of the preform. To address this issue, a selectively permeable veil 305 is applied to the reinforcement ply 302 to assist the resin in travelling horizontally through the reinforcement layer 302. The perimeter 365 shown in FIG. 7 represents the wing edge perimeter and the selectively permeable veil 305 may be used on an upper or lower wing surface. The selectively permeable veil 305 is predominately of a mid permeability pattern 245. The mid-permeability pattern has a pre-determined spatial density that is intended to allow resin to flow horizontally through the veil 305 at a steady rate. Some resin will also flow vertically through the veil 305 and into the reinforcement ply 302 beneath it. However, the veil 305 also includes areas of a high permeability pattern having a longitudinal portion 363 extending from the root 355 of the wing toward the tip 360 of the wing, and multiple branches 364 extending from the longitudinal portion 363 to the leading edge 361 and trailing edge 362 of the wing. The high permeability pattern areas 363,364 have a spatial density that is intended to speed up resin flow horizontally through the veil 305 and prevent the resin consolidating before it has infused all areas and extremities of the preform. Whilst the resin travels horizontally through the veil 305, some resin also flows vertically through the veil and into the preform. The transition from horizontal to vertical resin distribution is accommodated through the positioning and orientation of the veil 305, as resin will always flow both horizontally and vertically through the preform. By choosing the location of those high permeability pattern portions 363, 364 and allowing the resin to travel faster through the high permeability pattern areas of the veil 305, the resin reaches remote areas of the large preform 310 faster than it might otherwise, preventing incomplete resin impregnation.

In the embodiment of FIG. 8, a reinforcement ply 402 of a cylindrical dry preform 410 has a helically arranged veil 405 applied thereon. The cylindrical preform 410 may form the basis of a component such as a fuselage or such as a stiffening element for a skin. The preform has a complex geometry that can be difficult to evenly impregnate with resin. The helically arranged veil 405 is a strip of veil having a high permeability pattern, relative to the permeability of the reinforcement ply 402, arranged around the cylindrical reinforcement ply 402 to feed resin quickly to the lower permeability reinforcement ply 402. The high permeability of the veil 405 allows resin to travel quickly therethrough. The arrangement of the veil 405 helically around the preform 410 is intended to ensure complete resin impregnation of the reinforcement ply 402 and prevent resin trapoff i.e. the forming of regions in the preform in which an insufficient amount of resin is present to impregnate the preform within tolerances. In this embodiment, the resin predominantly follows the surface of the veil 405 on the cylindrical preform 405 as shown schematically by the arrow 420 although resin will also flow vertically through the veil 405, i.e. generally normal to the preform surface as shown schematically by the arrow 435, into the reinforcement ply 402 beneath it. In this example, therefore, the positioning and helical orientation of the veil 405 is used to direct the resin to those areas of the reinforcement ply 402 to which it is applied, as it has a higher permeability than the reinforcement ply 402. The low spatial density and therefore high permeability of the veil 405 allows the resin to fill the veil 405 quickly and then to bleed out to impregnate the rest of the reinforcement ply 402.

In some embodiments, the thickness of the veil can be varied to locally influence the flow rate of resin into specific areas of a preform. The embodiment of FIG. 9 schematically shows a veil 505 applied to a reinforcement ply 502 of another cylindrical dry preform 510. In this embodiment, the veil 505 covers the entire cylindrical surface of the reinforcement ply 502. The veil 505 comprises primarily of a single thickness portion 506 of the veil having a mid-permeability veil pattern combined with a helically arranged double thickness portion 504 having a high permeability pattern region that is arranged around the reinforcement ply 502. The mid permeability pattern portion 506 has a predetermined spatial density that is intended to allow resin to be evenly and steadily distributed throughout the preform in a manner similar to the mid permeability pattern of veil layer 205c referred to above. Resin flows 'horizontally' through the veil 505, i.e. it follows the curve of the veil as applied to the cylindrical preform surface as schematically shown by the arrow 520, with some of the resin also flowing 'vertically' i.e. generally normal to the preform surface as shown schematically by the arrow 531 through the veil 505 and into the reinforcement ply 502. The high permeability pattern portion 507 has a lower spatial density than the mid-permeability pattern portion 506 that is intended to increase the flow rate of resin in the high permeability areas 507 of the veil 505 so that it can then bleed out to reach areas of the reinforcement ply 502 that might otherwise be susceptible to resin trapoff. The double thickness of the high permeability portion 507 allows resin to pass vertically through the high permeability areas of the veil 505 at a greater flow rate than in the mid permeability pattern portion 506, to speed up preform consolidation and prevent resin trapoff.

Conversely, the selectively permeable veil can also be used to slow down or limit resin infusion through certain areas of a preform. An example of where this may be desirable is shown in FIG. 2 described above, in which the thicker portions 16 of the preform 10 need to be filled before the resin flow front 270 reaches the vacuum outlet 113. Accordingly, at a lower end of the preform 10, the veil layer 205d is of a low permeability pattern 255 that is spatially dense and is intended to slow the flow of resin horizontally through the veil 205d to prevent it from reaching the vacuum outlet 113 before the thicker portions 16 are impregnated with resin within tolerances.

The precise geometric application of the selectively permeable veil therefore enables a method of locally influencing permeability of a preform to promote resin flow through specific areas of different types of complex geometry preforms, potentially enabling complex-integrated preform geometries that could not previously be reliably infused.

In use, once the system 100, including the preform 10 of FIG. 2, has been assembled as discussed above, the resin supply 141 is heated to bring the resin to a suitable resin infusion temperature. Typically, the entire system is heated within the oven 170 (FIG. 1) that is also used for subsequent curing. The temperature for resin infusion will be dependent upon the resin system utilized, and will typically be selected to provide a suitable viscosity enabling the resin to flow through the resin flow path 142. For epoxy resins, a suitable infusion temperature may be in the range of 100 to 110° C.

At least partial vacuum pressure is applied to the downstream end of the first cavity 140, via the first vacuum source 151 and vacuum outlet(s) 113. A smaller partial vacuum (i.e., a higher absolute pressure) may also be applied to the resin supply 141, by way of a second vacuum source 155 connected to a second vacuum pipe 157, as shown in FIG. 1. The vacuum under the vacuum bagging film 130 of the first cavity 140 helps to prevent relaxation of the vacuum bagging film 130, which can lead to resin pooling and the associated loss of control of the resin infusion process. Where partial vacuum is applied to the resin supply 141 by the second vacuum source 155, a pressure differential may be maintained between the first vacuum source 151 and second vacuum source 155 such that the absolute pressure at the vacuum outlet(s) 113 applied by the first vacuum source 151 is lower than the absolute pressure at the resin supply 141. In one example, a full vacuum (0 mbar/0 kPa absolute pressure) may be applied by the first vacuum source 151 and a higher pressure/lower vacuum of 500 to 800 mbar absolute pressure (50 to 80 kPa) may be applied to the second vacuum source 155, thereby providing a pressure differential of the same amount driving resin from the resin supply 141 through the resin flow path 142. Full vacuum pressure may also be applied to the resin supply 141 by the second vacuum source 155 prior to resin infusion to degas the resin.

Maintaining at least partial vacuum on the resin supply ensures at least a partial vacuum is maintained throughout the first cavity 140. Atmospheric pressure acting on the dry preform 10 through the vacuum bagging film 130, the layer of permeable flow media 147 and the peel ply 145 acts to consolidate the dry preform 10. Resin moves through the first cavity 140 to form a wave front, through the layer of permeable flow media 147, which will generally have a greater permeability than both the peel ply 145 and the dry preform 10, thus forming the path of least resistance. Resin passing horizontally through the layer of permeable flow media 147 will also infuse down through the less permeable peel ply 145 and into the preform 10, via the layers of selectively permeable veil 205 that cause the resin to flow, both horizontally and vertically, through the varying permeability paths at differing flow rates according to the veil design, depending on the choice of location of the veil 205 and/or orientation of the veil 205 applied to the preform 10 and on the consequent changes in permeability or porosity of the flow path through the preform. Some resin will also flow laterally through the upstream edge 12 of the dry preform 10 and, to a lesser degree, through opposing side edges of the dry preform 10. Having the downstream edge 11 of the layer of permeable flow media 147 finish short of both the strip 143 of permeable flow media and the downstream portion 144 of the peel ply 145 prevents resin bypassing the preform 10 and simply being drawn through the layer of permeable flow media 147 directly into the vacuum outlet(s) 113. The rate of advance of the resin flow front 270 is inhibited in this exemplary embodiment in which the preform 10 includes thicker portions 16 that must be impregnated with resin within tolerances before the resin flow front reaches the vacuum outlet(s) 113, by forcing the resin to pass downstream longitudinally through a permeable resin flow control choke 180 defined by the downstream portion 144 of the peel ply 145 once it passes the downstream edge 11 of the dry preform 10 and the downstream edge of the layer of permeable flow media 147. However, the flow control choke 180 may not be necessary in all resin infusion applications.

Layers of veil 205, 305, 405, 505 that are made of resin soluble material will dissolve into the resin during resin infusion, mixing with the resin that impregnates the preform, which results in toughening of the infused preform when cured to produce a composite component. By toughening the preform, it is meant that the performance of the preform and of the resulting composite component is improved against impacts. In an embodiment, this characteristic of the veil is obtained by fabricating the veil from a thermoplastic material.

Once the dry preform 10 has been fully resin infused, the resin infused dry preform 10 may then be cured by gradually elevating the temperature of the oven 170 to a temperature suitable for curing of the resin. For typical epoxy resins, curing temperatures of the order of 180° C. to 200° C. will be typical. Full vacuum is typically maintained on the first vacuum source 151 during the curing process, to ensure the resin infused dry preform 10 remains consolidated and to assist in curing of the resin.

Layers of veil 205, 305, 405, 505 that are not resin soluble will melt into the resin during the curing process and disperse through the resin to toughen the resulting composite component.

Figure 10:
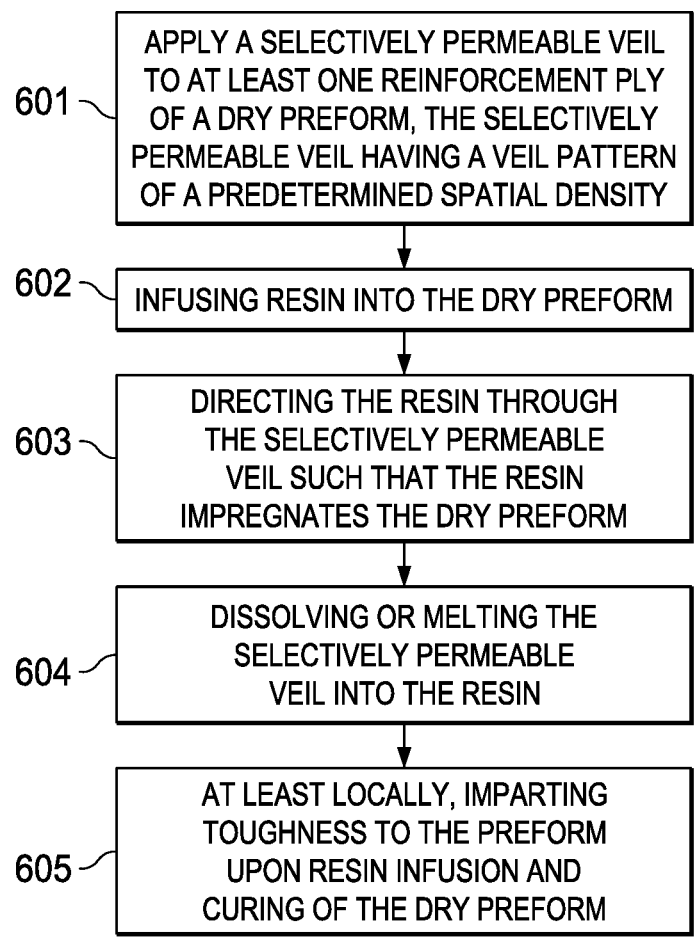
FIG. 10 is a flow chart of an exemplary method for locally influencing resin permeation through a dry preform.

A general method of locally influencing resin permeation through a dry preform having one or more reinforcement plies is shown in FIG. 10. At block 601, a selectively permeable veil having a veil pattern of a pre-determined spatial density is applied to at least one of the reinforcement plies of the dry preform. Resin is then infused into the dry preform at block 602. The resin is directed through the selectively permeable veil at block 603 such that the resin impregnates the dry preform. At block 604, the selectively permeable veil is dissolved into the resin. At block 605, toughness is imparted, at least locally, to the preform upon resin infusion and curing of the dry preform.

Figure 11:
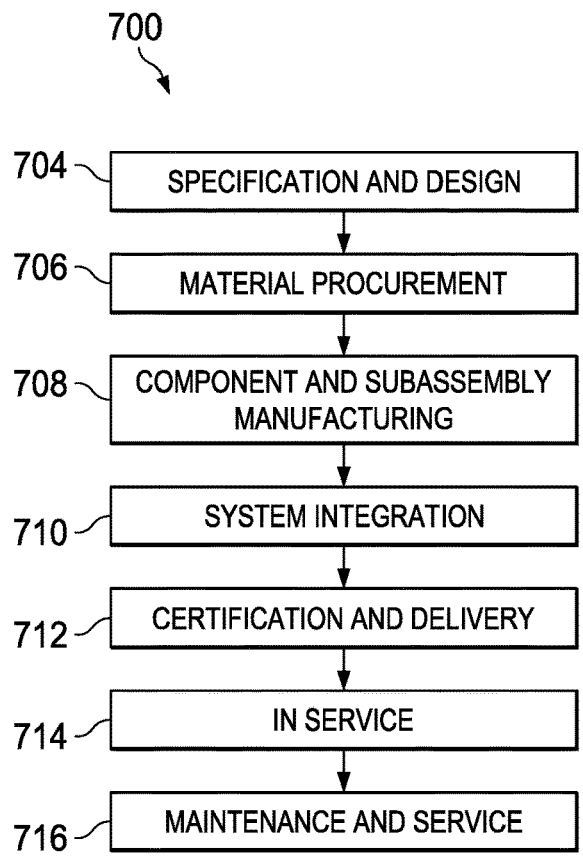
FIG. 11 is a flow diagram of an aircraft production and service methodology.
Figure 12:
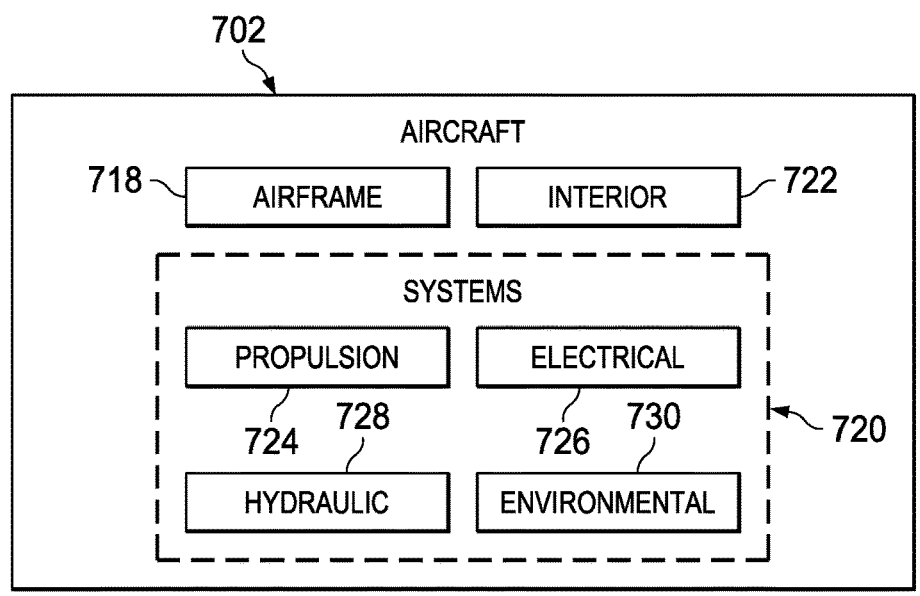
FIG. 12 is a block diagram of an aircraft.

Embodiments of the disclosure may be described in the context of an aircraft manufacturing and service method 700 as shown in FIG. 11 and an aircraft 702 as shown in FIG. 12. During pre-production, exemplary method 700 may include specification and design 704 of the aircraft 702 and material procurement 706. During production, component and subassembly manufacturing 708 and system integration 710 of the aircraft 702 takes place. Thereafter, the aircraft 702 may go through certification and delivery 712 in order to be placed in service 714. While in service by a customer, the aircraft 702 is scheduled for routine maintenance and service 716 (which may also include modification, reconfiguration, refurbishment, and so on). The disclosed methods, veil and composite components may be utilized during component and subassembly manufacturing 708, system integration 710 or maintenance and service 716. The disclosed methods, veil and composite components may be utilized to fabricate the airframe 718 and interior 722 of the aircraft 702.

Each of the processes of method 700 may be performed or carried out by a system integrator, a third party, and/or an operator (e.g. a customer). For the purpose of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 12, the aircraft 702 produced by exemplary method 700 may include an airframe 718 with a plurality of systems 720 and an interior 722. The disclosed embodiments may be used in the production of the airframe 718. Examples of high-level systems 720 include one or more of a propulsion system 724, an electrical system 726, a hydraulic system 726, and an environmental system 730. Any number of other systems may be included. Although an aerospace example is shown, the principles of the invention may be applied to other industries, such as the automotive and marine industries Apparatus and methods embodied herein may be employed during any one or more of the stages of the production and service method 700. For example, components or subassemblies corresponding to production process 708 may be fabricated or manufactured in a manner similar to components or subassemblies produced while the aircraft 702 is in service. Also, one or more apparatus embodiments, method embodiments, or a combination thereof may be utilized during the production stages 708 and 710, for example, by substantially expediting assembly of or reducing the cost of an aircraft 702. Similarly, one or more of apparatus embodiments, method embodiments, or a combination thereof may be utilized while the aircraft 702 is in service, for example and without limitation, to maintenance and service 716.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of locally influencing resin permeation of a dry preform having one or more reinforcement plies, comprising:
applying a selectively permeable veil to at least one of the reinforcement plies of the dry preform, the selectively permeable veil having a veil pattern of a predetermined spatial density tailored to a variable permeability of the dry preform and controlling lateral flow across the dry preform followed by normal flow and entirely impregnating the dry preform within tolerances;
applying a peel ply to an exterior of the dry preform;
infusing resin into the dry preform through the peel ply and the selectively permeable veil nearest a side of the dry preform nearest a vacuum bagging film and keeping a resin front, nearest the side of the dry preform nearest the vacuum bagging film, leading the resin front at a side of the dry preform nearest a tool face toward a vacuum outlet, such that the resin impregnates the dry preform entirely; and
locally imparting toughness to the dry preform via dissolving or melting the selectively permeable veil into the resin upon resin infusion and curing of the dry preform.

2. The method of claim 1, wherein the selectively permeable veil is selectively non-homogeneously permeable.

3. The method of claim 1, further comprising:
controlling a volume flow rate of resin flowing into and through the dry preform by forming the selectively permeable veil with the veil pattern having a locally varying spatial density.

4. The method of claim 1, further comprising:
controlling a volume flow rate of resin flowing into the dry preform by locally varying a thickness of the selectively permeable veil and directing the resin through a resin path.

5. The method of claim 1, further comprising:
applying the selectively permeable veil to increase a length of a resin path through the dry preform; and directing the resin through the resin path.

6. The method of claim 1, wherein applying the selectively permeable veil comprises 3D printing the selectively permeable veil onto a reinforcement ply of the dry preform.

7. The method of claim 1, wherein applying the selectively permeable veil comprises inkjet printing the selectively permeable veil onto a reinforcement ply of the dry preform.

8. The method of claim 1, wherein applying the selectively permeable veil comprises laying up the selectively permeable veil onto a reinforcement ply of the dry preform.

9. The method of claim 1, wherein applying the selectively permeable veil comprises pressure deposition of the selectively permeable veil onto a reinforcement ply of the dry preform through at least one nozzle.

10. The method of claim 1, wherein:
the dry preform comprises a plurality of reinforcement plies, and
locally influencing the variable permeability of the dry preform comprises applying the selectively permeable veil to at least some of the plurality of reinforcement plies.

11. The method of claim 10, further comprising:
applying a said selectively permeable veil having a first veil pattern to at least a first reinforcement ply of the plurality of reinforcement plies and a further selectively permeable veil having a second veil pattern to at least a second reinforcement ply of the plurality of reinforcement plies.

12. The method of claim 11, wherein the second veil pattern has a different spatial density and/or thickness to the first veil pattern.

13. A method of fabricating a composite component, comprising:
applying a selectively permeable veil, comprising a spatial density tailored to a permeability of a dry fiber preform, to at least one reinforcement ply of the dry fiber preform;
applying a peel ply to an exterior of the dry fiber preform;
fully infusing the dry fiber preform with resin through the peel ply and then the selectively permeable veil nearest a side of the dry fiber preform nearest a vacuum bagging film and keeping a resin front, nearest the side of the dry fiber preform nearest the vacuum bagging film, leading the resin front at a side of the dry fiber preform nearest a tool face toward a vacuum outlet;
locally influencing a resin flow front across the dry fiber preform followed by normal flow and entirely infusing the dry fiber preform through the peel ply and the selectively permeable veil; and
curing the dry fiber preform entirely infused with resin.

14. The method of claim 13, further comprising:
toughening the composite component by dissolving the selectively permeable veil into the resin during resin infusion.

15. The method of claim 13, further comprising:
toughening the composite component by melting and dispersing the selectively permeable veil into the resin during resin infusion.

16. A method of toughening a resin infused preform, the method comprising:
forming a selectively permeable veil comprising varying spatial density for controlling lateral flow across the resin infused preform followed by normal flow and entirely impregnating within tolerances the resin infused preform via:
placing the selectively permeable veil upon at least one reinforcement ply of a dry preform;
applying a peel ply to at an exterior of the dry preform; and
fully infusing the dry preform with a resin flowing through the peel ply and then the selectively permeable veil nearest a side of the resin infused preform nearest a vacuum bagging film and keeping a resin front, nearest the side of the resin infused preform nearest the vacuum bagging film, leading the resin front at a side of the resin infused preform nearest a tool face toward a vacuum outlet; and toughening the dry preform by dissolving or melting the selectively permeable veil into the resin infused into the dry preform.

17. The method of claim 16, further comprising keeping the resin front, nearest the side of the resin infused preform nearest the vacuum bagging film, leading the resin front at the side of the resin infused preform nearest the tool face toward the vacuum outlet by less than 3 inches.

18. The method of claim 16, further comprising wherein the selectively permeable veil is selectively non-homogeneously permeable.

19. The method of claim 16, further comprising applying the selectively permeable veil to increase a length of a resin path through the dry preform; and directing the resin through the resin path.

20. A method of controlling a flow front of a resin infusing a preform comprising variable permeability, the method comprising:

forming a selectively permeable veil comprising varying spatial density for controlling lateral flow across the preform followed by normal flow and entirely impregnating the preform within tolerances via:
placing the selectively permeable veil upon at least one reinforcement ply of a dry preform; and
fully infusing the dry preform with the selectively permeable veil nearest a side of the preform nearest a vacuum bagging film and keeping a resin front, nearest the side of the preform nearest the vacuum bagging film leading the resin front at a side of the preform nearest a tool face toward a vacuum outlet by less than 3 inches; and
toughening the dry preform by dissolving or melting the selectively permeable veil into the resin infused into the dry preform.

* * * * *